United States Patent
Vijaya Kumar et al.

(10) Patent No.: US 12,024,026 B2
(45) Date of Patent: Jul. 2, 2024

(54) ONE PEDAL DRIVING SYSTEM FOR AN ELECTRIC VEHICLE WITH ACTIVE ZONE NOTIFICATION

(71) Applicant: GM Global Technology Operations LLC, Detroit, MI (US)

(72) Inventors: Vivek Vijaya Kumar, Shelby Township, MI (US); Mohammad Naserian, Windsor (CA); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 320 days.

(21) Appl. No.: 17/731,750

(22) Filed: Apr. 28, 2022

(65) Prior Publication Data

US 2023/0347752 A1    Nov. 2, 2023

(51) Int. Cl.
*B60L 15/20* (2006.01)
*B60L 7/10* (2006.01)

(52) U.S. Cl.
CPC ............. *B60L 15/2018* (2013.01); *B60L 7/10* (2013.01); *B60L 2240/12* (2013.01); *B60L 2240/62* (2013.01); *B60L 2240/64* (2013.01); *B60L 2240/642* (2013.01); *B60L 2240/645* (2013.01); *B60L 2240/68* (2013.01); *B60L 2240/70* (2013.01); *B60L 2250/26* (2013.01)

(58) Field of Classification Search
CPC .... B60L 15/2018; B60L 7/10; B60L 2240/12; B60L 2240/62; B60L 2240/64; B60L 2240/642; B60L 2240/645; B60L 2240/68; B60L 2240/70; B60L 2250/26; B60L 7/18
See application file for complete search history.

(56) References Cited

U.S. PATENT DOCUMENTS

| | | | |
|---|---|---|---|
| 2020/0298709 A1* | 9/2020 | Yanagita | G05D 1/0214 |
| 2022/0009355 A1* | 1/2022 | Kim | B60L 53/66 |
| 2023/0050845 A1* | 2/2023 | Zhang | B60T 8/52 |

FOREIGN PATENT DOCUMENTS

WO    WO-2017016716 A1 *   2/2017

OTHER PUBLICATIONS

English translation of Huber (WO-2017016716) (Year: 2017).*

* cited by examiner

*Primary Examiner* — James M McPherson
*Assistant Examiner* — Kyle J Kingsland
(74) *Attorney, Agent, or Firm* — Vivacqua Crane, PLLC

(57) ABSTRACT

A one pedal driving system for an electric vehicle including one or more electric motors includes a controller in wireless communication with one or more external vehicle networks. The controller executes instructions to receive, from the one or more external vehicle networks, an active zone notification that indicates the electric vehicle is traveling into a one pedal driving zone. The one pedal driving zone represents a section of roadway where the electric vehicle decelerates from an initial speed. The controller executes instructions to receive a pedal notification that a driver foot is removed from an accelerator pedal of the electric vehicle. In response to receiving the active zone notification and the pedal notification, the controller instructs the electric vehicle to decelerate from the initial speed by a regenerative braking torque that is created by the one or more electric motors to counteract a forward momentum of the electric vehicle.

20 Claims, 3 Drawing Sheets

ONE PEDAL DRIVING SYSTEM FOR AN ELECTRIC VEHICLE WITH ACTIVE ZONE NOTIFICATION

INTRODUCTION

The present disclosure relates to a one pedal driving system for an electric vehicle activated in response to receiving an active zone notification and when a driver foot is removed from the accelerator pedal. The one pedal driving zone represents a section of roadway where the electric vehicle decelerates from an initial speed to a stop or a reduced speed.

Many electric vehicles offer a one pedal driving system, which provides a driver with the ability to stop and go using only an accelerator pedal. A growing number of electrified vehicles make one pedal driving available through the vehicle's regenerative braking system. When the vehicle brakes, the vehicle's electric motor may act as a generator to convert kinetic energy created by the vehicle's forward motion into electricity. The electricity produced is used to recharge the vehicle's battery.

A one pedal driving system usually includes an on-off switch that is manually selected by a driver to activate the one pedal driving feature. As the driver anticipates a stop due to a traffic light or a stop sign, the driver may ease his or her foot off the accelerator pedal, and the vehicle will begin to decelerate. The vehicle is gradually decelerated and eventually stops, and the brakes stay engaged to keep the vehicle at a full stop until the driver presses the accelerator pedal to move forward again. However, it is to be appreciated that one pedal driving is a manually initiated by a driver. Accordingly, there may be lost opportunities to recharge the vehicle's battery since one pedal driving is activated manually.

Thus, while current one pedal driving systems achieve their intended purpose, there is a need in the art for an improved one pedal driving system with enhanced regeneration efficiency.

SUMMARY

According to several aspects, a one pedal driving system for an electric vehicle including one or more electric motors is disclosed. The one pedal driving system includes a controller in wireless communication with one or more external vehicle networks. The controller executes instructions to receive, from the one or more external vehicle networks, an active zone notification that indicates the electric vehicle is traveling into a one pedal driving zone, where the one pedal driving zone represents a section of roadway where the electric vehicle decelerates from an initial speed. The controller executes instructions to receive a pedal notification that a driver foot is removed from an accelerator pedal of the electric vehicle. In response to receiving the active zone notification and the pedal notification, the controller instructs the electric vehicle to decelerate from the initial speed by a regenerative braking torque that is created by the one or more electric motors to counteract a forward momentum of the electric vehicle.

In one aspect, the one pedal driving zone includes a horizontal curve and the electric vehicle decelerates to a reduced speed.

In another aspect, the one pedal driving system includes a plurality of vehicle sensors in electronic communication with the controller. The controller executes instructions to receive situational data related to the electric vehicle from the plurality of vehicle sensors and determine a presence and speed of a preceding vehicle located immediately in front of the electric vehicle based on the situational data. In response to determining the presence of a preceding vehicle located immediately in front of the electric vehicle, the controller instructs the electric vehicle to decelerate based on movement of the preceding vehicle located immediately in front of the electric vehicle.

In an aspect, the controller executes instructions to determine a speed of the preceding vehicle is less than a recommended speed, and in response to determining the speed of the preceding vehicle is less than the recommended speed, the controller instructs the electric vehicle to follow the preceding vehicle.

In another aspect, the recommended speed is based on a radius of the horizontal curve and roadway characteristics.

In still another aspect, the one pedal driving system further including a plurality of vehicle sensors in electronic communication with the controller. The controller executes instructions to receive situational data related to the electric vehicle from the plurality of vehicle sensors, determine no preceding vehicle exists immediately in front of the electric vehicle based on the situational data, and in response to determining no preceding vehicle exists immediately in front of the electric vehicle, the controller instructs the electric vehicle to decelerate to a recommended speed.

In an aspect, the one pedal driving zone includes an active work zone and the electric vehicle decelerates to a reduced speed.

In another aspect, the one pedal driving system further includes a plurality of vehicle sensors in electronic communication with the controller. The controller executes instructions to receive situational data related to the electric vehicle from the plurality of vehicle sensors and determines a presence and speed of a preceding vehicle located immediately in front of the electric vehicle based on the situational data. In response to determining the presence of a preceding vehicle located immediately in front of the electric vehicle, the controller instructs the electric vehicle to decelerate based on movement of the preceding vehicle located immediately in front of the electric vehicle.

In still another aspect, the controller executes instructions to determine a speed of the preceding vehicle is less than the reduced speed, and in response to determining the speed of the preceding vehicle is less than the reduced speed limit, instruct the electric vehicle to follow the preceding vehicle.

In an aspect, the controller executes instructions to receive situational data related to the electric vehicle from the plurality of vehicle sensors, determine no preceding vehicle exists immediately in front of the electric vehicle based on the situational data, and in response to determining no preceding vehicle exists immediately in front of the electric vehicle, instruct the electric vehicle to decelerate to a reduced speed limit.

In another aspect, the one pedal driving zone includes a signalized intersection.

In yet another aspect, in response to receiving the active zone notification and the pedal notification, the controller monitors one or more vehicle systems to determine the electric vehicle is either preceding straight through the signalized intersection or is about to make a turn. In response to determining the electric vehicle is about to make a turn, the controller executes instructions to allow the electric vehicle to turn without decelerating the electric vehicle. In response to determining the electric vehicle is about to proceed straight through the signalized intersection, the controller executes instructions to control a rate of deceleration of the electric vehicle based on a presence of a preceding vehicle being detected immediately in front of the electric vehicle.

In an aspect, the one pedal driving zone includes an intersection having a stop sign.

In another aspect, the one pedal driving zone is a section of the roadway where one or more emergency vehicles are responding to an incident.

In still another aspect, the one pedal driving zone includes a graded section of roadway.

In an aspect, the graded section of roadway is either an uphill grade or a downhill grade.

In an aspect, a one pedal driving system for an electric vehicle including one or more electric motors is disclosed. The one pedal driving system includes a controller in wireless communication with one or more external vehicle networks. The controller executes instructions to receive, from the one or more external vehicle networks, an active zone notification that indicates the electric vehicle is traveling into a one pedal driving zone, where the one pedal driving zone represents a section of roadway where the electric vehicle decelerates from an initial speed. The controller executes instructions to receive a pedal notification that a driver foot is removed from an accelerator pedal of the electric vehicle. In response to receiving the active zone notification and the pedal notification, the controller instructs the electric vehicle to decelerate from the initial speed to a stop by a regenerative braking torque that is created by the one or more electric motors to counteract a forward momentum of the electric vehicle.

In another aspect, one pedal driving zone includes one of the following: a signalized intersection, a stop sign, and an emergency vehicle.

a one pedal driving system for an electric vehicle including one or more electric motors is disclosed. The one pedal driving system includes a controller in wireless communication with one or more external vehicle networks. The controller executes instructions to receive, from the one or more external vehicle networks, an active zone notification that indicates the electric vehicle is traveling into a one pedal driving zone, where the one pedal driving zone represents a section of roadway where the electric vehicle decelerates from an initial speed. The controller executes instructions to receive a pedal notification that a driver foot is removed from an accelerator pedal of the electric vehicle. In response to receiving the active zone notification and the pedal notification, the controller instructs the electric vehicle to decelerate from the initial speed to a reduced speed by a regenerative braking torque that is created by the one or more electric motors to counteract a forward momentum of the electric vehicle.

In another aspect, the one pedal driving zone includes one of the following: a graded section of roadway, an active work zone, and a horizontal curve.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
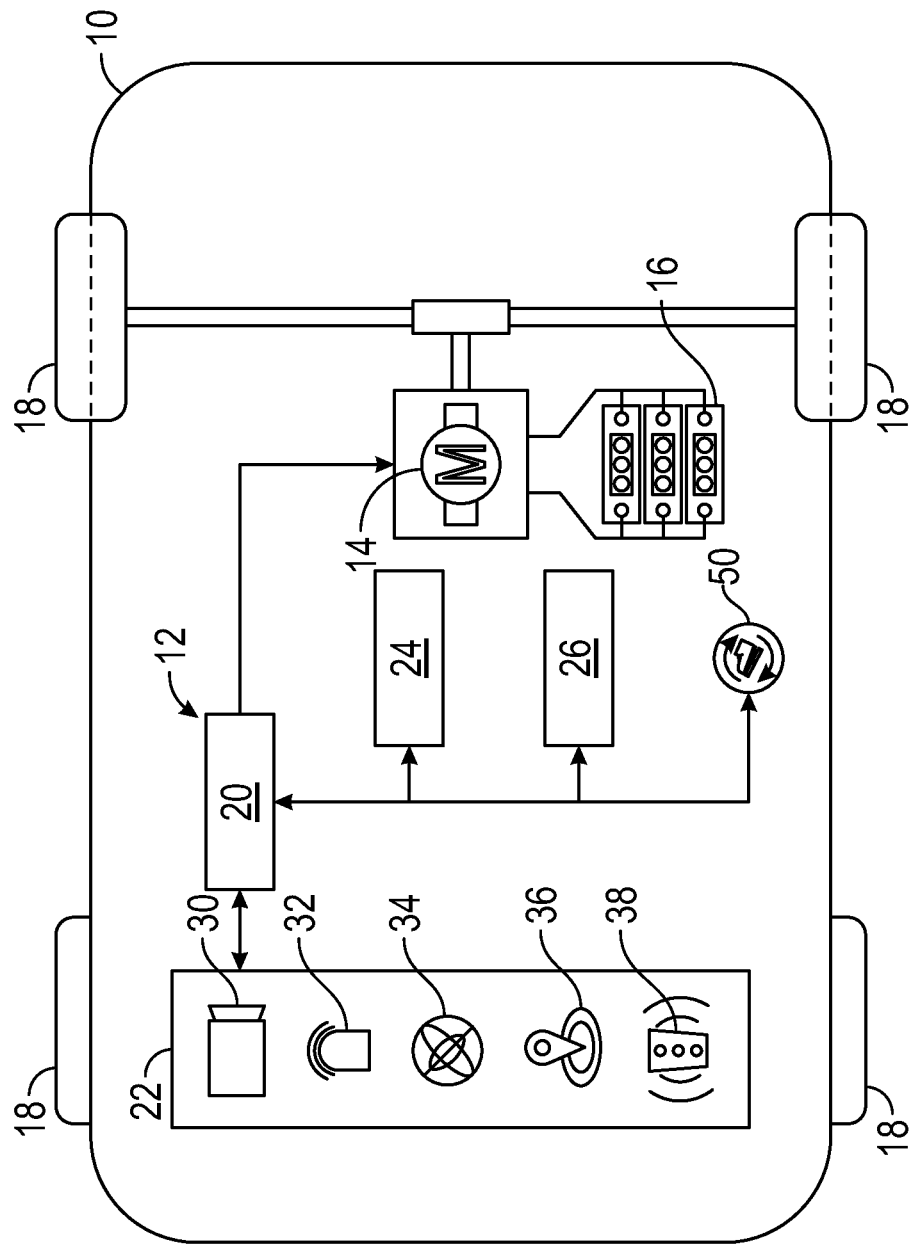
FIG. 1 is a schematic diagram of the disclosed one pedal driving system for an electric vehicle that is activated in response to receiving an active zone notification and a pedal notification, according to an exemplary embodiment.

Referring to FIG. 1, an exemplary one pedal driving system 12 for a vehicle 10 is shown. The vehicle 10 is an electric vehicle including one or more electric motors 14 for providing at least a part of the vehicle motive power such as, for example, a hybrid electric vehicle (HEV), a plug-in hybrid electric vehicle (PHEV), or a battery electric vehicle (BEV). The vehicle 10 may be any type of vehicle such as, but not limited to, a sedan, truck, sport utility vehicle, van, or motor home. The one pedal driving system 12 includes one or more controllers 20 in electronic communication with a plurality of vehicle sensors 22, one or more vehicle systems 24, and one or more external vehicle networks 26 that are in wireless communication with the controller 20. In the example as shown in FIG. 1, the plurality of vehicle sensors 22 include one or more cameras 30, one or more radar sensors 32, an inertial measurement unit (IMU) 34, a global positioning system (GPS) 36, and LiDAR 38, however, it is to be appreciated that additional sensors may be used as well. The external vehicle networks 26 may include, but are not limited to, cellular networks, dedicated short-range communications (DSRC) networks, and vehicle-to-infrastructure (V2X) networks.

As explained below, the one pedal driving system 12 enhances regenerative braking efficiency by intelligently applying regenerative braking in response to receiving an active zone notification from the external vehicle networks 26 and determining that a driver has removed his or her foot from an accelerator pedal. The active zone notification is an electronic message indicating the vehicle 10 is entering a one pedal driving zone 40 along a roadway 42 (shown in FIGS. 2A-2F). The vehicle 10 either decelerates in speed or comes to a stop when driving within the one pedal driving zone 40 (FIGS. 2A-2F). During regenerative braking, the one or more electric motors 14 create a regenerative braking torque that is applied to the wheels 18 of the vehicle 10, where the regenerative braking torque counteracts a forward momentum of the vehicle 10 to decelerate the vehicle 10.

It is to be appreciated that regenerative braking enables the kinetic energy of the vehicle 10 to be converted back into electrical energy as the regenerative braking torque is created. The electrical energy is stored in an energy storage device 16 in electronic communication with the one or more electric motors 14. The energy storage device 16 is any type of rechargeable device that stores electrical energy such as, for example, batteries and ultracapacitors.

Figure 2B:
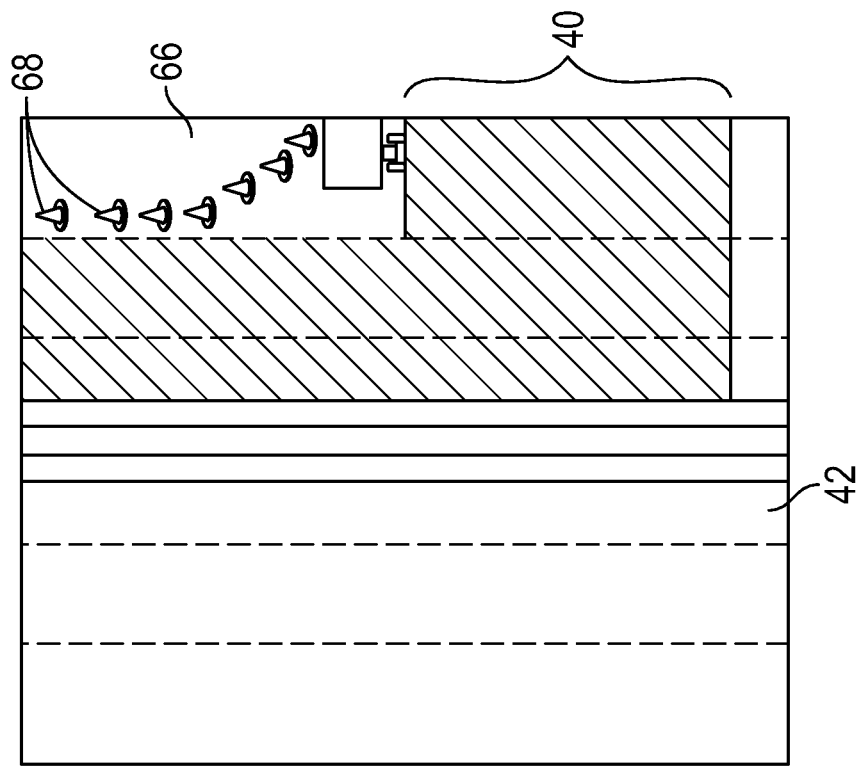
FIG. 2B illustrates the one pedal driving zone as an active work zone, according to an exemplary embodiment.
Figure 2A:
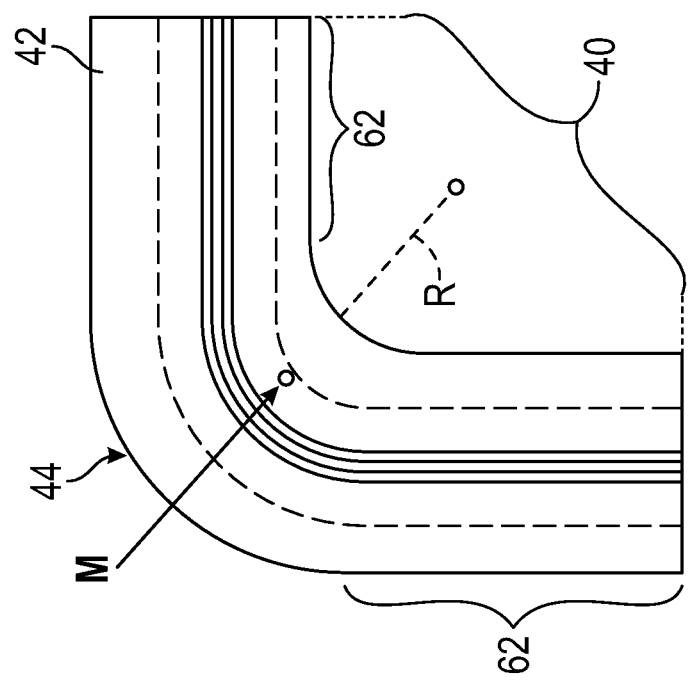
FIG. 2A illustrates an exemplary one pedal driving zone as a horizontal curve along the roadway, according to an exemplary embodiment.
Figure 2C:
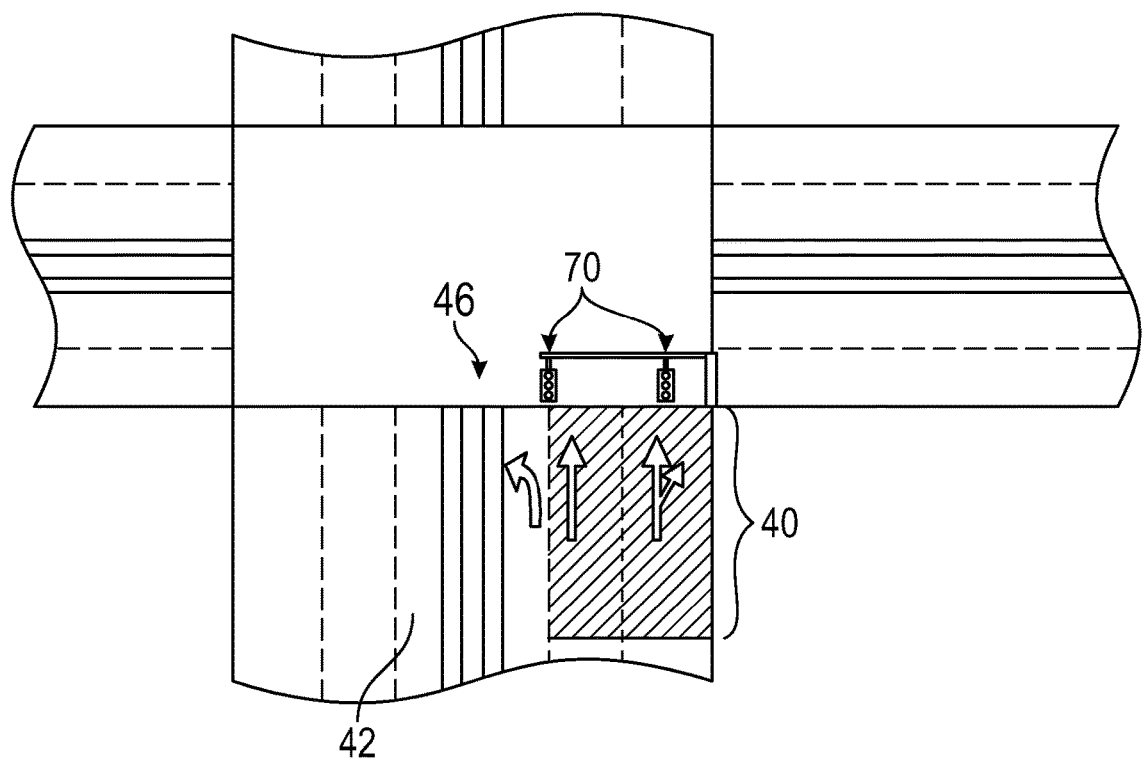
FIG. 2C illustrates the one pedal driving zone as a signalized intersection where a traffic light is either red or about to turn red, according to an exemplary embodiment.
Figure 2D:
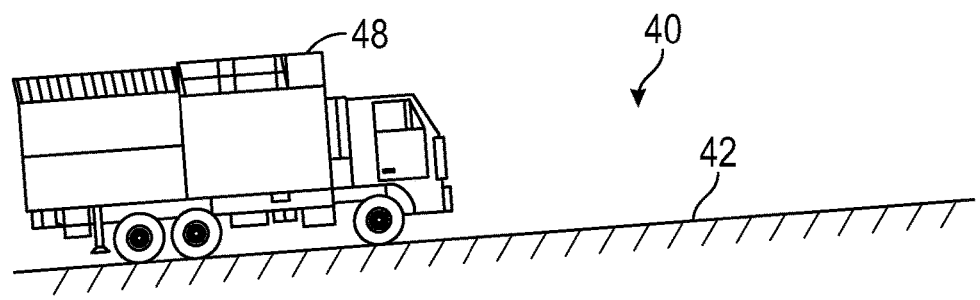
FIG. 2D illustrates the one pedal driving zone as including an emergency vehicle, according to an exemplary embodiment.
Figure 2E:
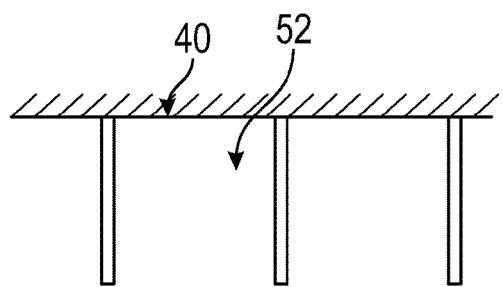
FIG. 2E illustrates the one pedal driving zone as including a parking zone, according to an exemplary embodiment.
Figure 2F:
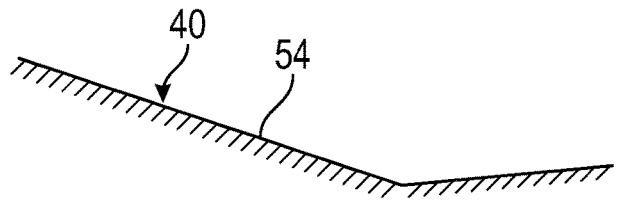
FIG. 2F illustrates the one pedal driving zone as including a graded section, according to an exemplary embodiment.

Referring to FIGS. 1 and 2A, the one pedal driving zone 40 represents a section of the roadway 42 where the vehicle 10 decelerates from an initial speed. In the example as shown in FIG. 2A, the one pedal driving zone 40 includes a horizontal curve 44 along the roadway 42. FIG. 2B illustrates the one pedal driving zone 40 includes an active work zone. In the examples as shown in FIGS. 2A and 2B, the vehicle 10 decelerates from the initial speed to a reduced speed. FIG. 2C illustrates the one pedal driving zone 40 includes a signalized intersection 46. In the example as shown in FIG. 2C, the vehicles 10 decelerates from the initial speed to a stop. In the example as shown in FIG. 2D, the one pedal driving zone 40 is a section of the roadway 42 where one or more emergency vehicles 48 are responding to an incident. In the example as shown in FIG. 2D, the emergency vehicle 48 is a fire truck, however, it is to be appreciated that the emergency vehicle may be another type of vehicle as well such as, for example, an ambulance. In the embodiment as shown in FIG. 2E, the one pedal driving zone 40 includes a parking zone 52. Furthermore, in the embodiment as shown in FIG. 2F, the one pedal driving zone 40 includes a graded section 54 of roadway. In the example as shown in FIG. 2F, the graded section 54 is a downhill grade, however, an uphill grade may be used as well.

In one embodiment, the one pedal driving system 12 is manually activated by a user. For example, a user may choose to activate the one pedal driving system 12 by selecting an option displayed upon on a touchscreen that is part of the vehicle 10. In one implementation, the one pedal driving system 12 performs regenerative braking based on a user-selected level of control. For example, in one embodiment, the one pedal driving system 12 includes a low, medium, and high level of regenerative braking. A user may select the level of regenerative braking based on his or her preferences, where the low level provides the least amount of regenerative braking and the high level provides the greatest amount of regenerative braking. In one embodiment, the one pedal driving system 12 includes an indicator 50 in electronic communication with the controller 20. The indicator 50 generates a notification that informs an individual that the one pedal driving system 12 is activated. The indicator 50 may be, for example, a graphic generated by a vehicle head-up display or, alternatively, an indicator light that is illuminated when activated.

The one or more vehicle systems 24 may include systems such as, but not limited to, an automated driving system, a driver monitoring system (DMS), a braking system, an adaptive cruise control system, a turn signal system, and an accelerator pedal module. As mentioned above, the one or more external vehicle networks 26 may include cellular networks, DSRC networks, and V2X networks that collect data such as, but not limited to, signal phase and timing (SPaT) data that includes a current state of a traffic signal, intersection map data (MAP) that indicates road geometry of an intersection, and work zone data (WZDx) that provides a description of a construction zone event (e.g., advisory speed limits, lane closures, etc.).

Referring to FIGS. 1 and 2A, the controller 20 receives, from the one or more external vehicle networks 26, the active zone notification that indicates the vehicle 10 is traveling into the one pedal driving zone 40. The one pedal driving zone 40 represents a section of the roadway 42 where the vehicle 10 decelerates from an initial speed. In the example as shown in FIG. 2A, the vehicle 10 decelerates from the initial speed to the reduced speed while traveling around the horizontal curve 44. In one embodiment the controller 20 instructs the indicator 50 to generate a message informing the driver of the vehicle 10 that the one pedal driving system 12 is activated and the vehicle 10 is about to decelerate in response to receiving the active zone notification and receiving a pedal notification, where the pedal notification indicates that a driver foot is removed from the accelerator pedal. For example, an accelerator pedal module in electronic communication with a sensor may generate the pedal notification.

In the example as shown in FIG. 2A, the one pedal driving zone 40 includes the horizontal curve 44. The horizontal curve 44 provides a transition between two straight sections 62 of the roadway 42. The horizontal curve 44 defines a radius R, where increasing the radius R results in the vehicle 10 decelerating at a higher rate when traversing the horizontal curve 44. In an embodiment, the active zone notification includes information such as, but not limited to, curvature approach segment, curvature start point, curvature end point, and the radius R of the horizontal curve 44. In one embodiment, a speed look-up table is stored in memory of the controller 20, where the speed look-up table provides a recommended speed for the vehicle 10 based on the radius R of the horizontal curve 44 and roadway characteristics such as, but not limited to, a banking angle and a coefficient of friction.

In response to receiving the active zone notification and the pedal notification, the controller 20 instructs the vehicle 10 to decelerate from the initial speed by a regenerative braking torque created by the one or more electric motors 14 to counteract a forward momentum of the vehicle 10. If applicable, the controller 20 controls a rate of deceleration the vehicle 10 based on a presence of a preceding vehicle being detected immediately in front of the vehicle 10. Specifically, the controller 20 receives situational data related to the vehicle 10 from the plurality of vehicle sensors 22, the one or more vehicle system 24, and the external vehicle networks 26. The situational data provides the controller 20 with situational awareness of the surrounding environment and includes information such as, but not limited to, SPaT data, MAP data, data related to driver attentiveness from the DMS, and object detection data. The controller 20 determines the presence and speed of a preceding vehicle located immediately in front of the vehicle 10 based on the situational data.

In response to determining the presence of a preceding vehicle located immediately in front of the vehicle 10, the controller 20 instructs the vehicle 10 to decelerate based on the movement of the preceding vehicle located immediately in front of the vehicle 10. Specifically, if the controller 20 determines that the speed of the preceding vehicle is less than the recommended speed, then the vehicle 10 follows the preceding vehicle. In the alternative, if the speed of the preceding vehicle is greater than the recommended speed, then the controller 20 instructs the vehicle 10 to travel at the recommended speed while traversing the horizontal curve 44. Alternatively, in response to determining no preceding vehicle exists immediately in front of the vehicle 10, the controller 20 instructs the vehicle 10 to decelerate to the recommended speed. As the vehicle 10 drives through a midpoint M of the horizontal curve 44, the controller 20 instructs the vehicle 10 to coast through the remaining portion of the horizontal curve 44. Once the vehicle 10 has traversed the horizontal curve 44, the controller 20 instructs the vehicle 10 to travel at an original speed that the vehicle 10 was traveling at before decelerating.

The controller 20 determines an amount of regenerative braking torque based on a travel distance within the one pedal driving zone 40, the level of regenerative braking selected by the user (e.g., low, medium, or high), a capacity of the energy storage device 16, and estimated road friction. In one embodiment, a regenerative braking look-up table is saved in memory of the controller 20. The regenerative braking look-up table is a multi-dimensional look-up table that determines an amount of regenerative braking torque. In an embodiment, the controller 20 adjusts the level of regenerative braking based on the estimated road friction, where the adjustment may override a user-selected level. For example, the controller 20 may determine the roadway is slippery based on the estimated road friction, and therefore decreases the level of regenerative braking.

Referring now to FIGS. 1 and 2B, in another embodiment the one pedal driving zone 40 includes the active work zone. The active work zone may include, for example, utility workers located on the roadway 42, one or more lane closures, one or more detours, and moving equipment. In the example as shown in FIG. 2B, one of the lanes 66 are closed, which is indicated by the construction cones 68 disposed along the closed lane 66. The active work zone includes a reduced speed limit to accommodate the workers, lane closures, detours, and moving equipment. In an embodiment, the active zone notification includes information such as, but not limited to, a work zone approach lane, a work zone start location, a work zone end location, a value of the reduced speed limit, lane closure start location, and lane closure end location. The work zone approach lane identifies a segment of roadway before the work zone starts.

In response to receiving the active zone notification and the pedal notification, the controller 20 instructs the vehicle 10 to decelerate from the initial speed by a regenerative braking torque created by the one or more electric motors 14 to counteract a forward momentum of the vehicle 10. If applicable, the controller 20 controls a rate of deceleration the vehicle 10 based on a presence of a preceding vehicle being detected immediately in front of the vehicle 10. Specifically, the controller 20 receives situational data related to the vehicle 10 and determines the presence and speed of a preceding vehicle located immediately in front of the vehicle 10 based on the situational data. In response to determining the presence of a preceding vehicle located immediately in front of the vehicle 10, the controller 20 instructs the vehicle 10 to decelerate based on the movement of the preceding vehicle located immediately in front of the vehicle 10. Specifically, if the controller 20 determines that the speed of the preceding vehicle is less than the reduced speed limit, then the vehicle 10 follows the preceding vehicle. In the alternative, if the speed of the preceding vehicle is greater than the reduced speed limit speed, then the controller 20 instructs the vehicle 10 to travel at the recommended speed. Alternatively, in response to determining no preceding vehicle exists immediately in front of the vehicle 10, the controller 20 instructs the vehicle 10 to decelerate to the reduced speed limit.

Referring now to FIGS. 1 and 2C, in another embodiment the one pedal driving zone 40 includes the signalized intersection 46, where a traffic light 70 is either red or about to turn red. Although FIG. 2C illustrates a signalized intersection 46, in another embodiment the one pedal driving zone 40 includes a non-signalized intersection having a stop sign instructing vehicles to stop in place of the traffic light 70. In the example as shown in FIG. 2C, the signalized intersection 46 is a four-way intersection, however, it is to be appreciated that FIG. 2C is merely exemplary in nature and the signalized intersection 46 may be a three-way intersection or a two-way intersection as well. In an embodiment, the active zone notification includes information such as, but not limited to, a distance to a stop bar, signal phase and timing data, intersection map data, and green light optimized speed advisory (GLOSA) information.

In response to receiving the active zone notification and determining the driver foot is removed from the accelerator pedal, the controller 20 monitors the one or more vehicle systems 24 to determine the vehicle 10 is either preceding straight through the intersection or is about to make a turn. For example, the controller 20 may determine the vehicle 10 is about to turn based on a turn signal indicator being activated. In response to determining the vehicle 10 plans to make a turn, the controller 20 does not activate the one pedal driving system 12 and regenerative braking is not performed. However, in response to determining the vehicle plans to make the turn, the controller 20 controls a rate of deceleration of the vehicle 10 based on the presence of a preceding vehicle being detected immediately in front of the vehicle 10. Alternatively, in response to determining no preceding vehicle exists immediately in front of the vehicle 10, the controller 20 instructs the vehicle 10 to decelerate based on the distance to the distance to a stop bar, signal phase and timing data, intersection map data, and GLOSA information.

Referring now to FIG. 2D, the one pedal driving zone 40 is a section of the roadway 42 where one or more emergency vehicles 48 are responding to an incident. In an embodiment, the active zone notification includes information such as, but not limited to, the location of the emergency vehicle and the type of emergency vehicle (e.g., fire truck, ambulance, etc.). Referring to both FIGS. 1 and 2D, in response to receiving the active zone notification and the pedal notification, the controller 20 instructs the vehicle 10 to decelerate from the initial speed to a stop to allow the emergency vehicle 48 to pass. It is to be appreciated that the controller 20 instructs the vehicle 10 to stop in a location where an intersection is not blocked and the emergency vehicle 48 is free to pass.

In the embodiment as shown in FIG. 2E, the one pedal driving zone 40 includes the parking zone 52. Referring to both FIGS. 1 and 2E, the controller 20 receives a park assist notification from a park assist system indicating that the one pedal driving system 12 is activated. When activated, the park assist system guides the vehicle 10 into the parking zone 52. In response to receiving the park assist notification and the pedal notification, the controller 20 instructs the vehicle 10 to decelerate from the initial speed and to a stop within the parking zone 52.

In the embodiment as shown in FIG. 2F, the one pedal driving zone 40 includes the graded section 54 of roadway. As mentioned above, the graded section 54 is illustrated as a downhill grade, however, an uphill grade may be used as well. Referring to FIGS. 1 and 2F, in response to receiving the active zone notification and the pedal notification, the controller 20 instructs the vehicle 10 to decelerate to maintain the initial speed and to maintain a minimum headway distance between surrounding vehicles while traveling the downhill grade. Alternatively, if the graded section 54 is an uphill grade, in response to receiving the active zone notification and the pedal notification, the controller 20 instructs the vehicle 10 to accelerate to maintain the initial speed and to maintain a minimum headway distance between surrounding vehicles while traveling the uphill grade.

Referring generally to the figures, the disclosed one pedal driving system provides various technical effects and benefits. Specifically, the disclosed one pedal driving system enhances regenerative braking efficiency by intelligently applying regenerative braking in response to receiving an active zone notification and determining that a driver has removed his or her foot from an accelerator pedal. Improving regenerative braking efficiency may enhance a user's overall driving experience and improve overall customer satisfaction.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A one pedal driving system for an electric vehicle including one or more electric motors, the one pedal driving system comprising:
    a controller in wireless communication with one or more external vehicle networks, wherein the controller executes instructions to:
        receive, from the one or more external vehicle networks, an active zone notification that indicates the electric vehicle is traveling into a one pedal driving zone, wherein the one pedal driving zone represents a section of roadway where the electric vehicle decelerates from an initial speed;
        receive a pedal notification that a driver foot is removed from an accelerator pedal of the electric vehicle; and
        in response to receiving the active zone notification and the pedal notification, instruct the electric vehicle to decelerate from the initial speed by a regenerative braking torque that is created by the one or more electric motors to counteract a forward momentum of the electric vehicle.

2. The one pedal driving system of claim 1, wherein the one pedal driving zone includes a horizontal curve and the electric vehicle decelerates to a reduced speed.

3. The one pedal driving system of claim 2, further including a plurality of vehicle sensors in electronic communication with the controller, wherein the controller executes instructions to:
    receive situational data related to the electric vehicle from the plurality of vehicle sensors;
    determine a presence and speed of a preceding vehicle located immediately in front of the electric vehicle based on the situational data; and
    in response to determining the presence of a preceding vehicle located immediately in front of the electric vehicle, instructs the electric vehicle to decelerate based on movement of the preceding vehicle located immediately in front of the electric vehicle.

4. The one pedal driving system of claim 3, wherein the controller executes instructions to:
    determine a speed of the preceding vehicle is less than a recommended speed; and
    in response to determining the speed of the preceding vehicle is less than the recommended speed, instruct the electric vehicle to follow the preceding vehicle.

5. The one pedal driving system of claim 4, wherein the recommended speed is based on a radius of the horizontal curve and roadway characteristics.

6. The one pedal driving system of claim 3, further including a plurality of vehicle sensors in electronic communication with the controller, wherein the controller executes instructions to:
    receive situational data related to the electric vehicle from the plurality of vehicle sensors;
    determine no preceding vehicle exists immediately in front of the electric vehicle based on the situational data; and
    in response to determining no preceding vehicle exists immediately in front of the electric vehicle, instruct the electric vehicle to decelerate to a recommended speed.

7. The one pedal driving system of claim 1, wherein the one pedal driving zone includes an active work zone and the electric vehicle decelerates to a reduced speed.

8. The one pedal driving system of claim 7, further including a plurality of vehicle sensors in electronic communication with the controller, wherein the controller executes instructions to:
    receive situational data related to the electric vehicle from the plurality of vehicle sensors;
    determine a presence and speed of a preceding vehicle located immediately in front of the electric vehicle based on the situational data; and
    in response to determining the presence of a preceding vehicle located immediately in front of the electric vehicle, instruct the electric vehicle to decelerate based on movement of the preceding vehicle located immediately in front of the electric vehicle.

9. The one pedal driving system of claim 8, wherein the controller executes instructions to:
    determine a speed of the preceding vehicle is less than the reduced speed; and
    in response to determining the speed of the preceding vehicle is less than the reduced speed limit, instruct the electric vehicle to follow the preceding vehicle.

10. The one pedal driving system of claim 7, wherein the controller executes instructions to:
    receive situational data related to the electric vehicle from the plurality of vehicle sensors;
    determine no preceding vehicle exists immediately in front of the electric vehicle based on the situational data; and
    in response to determining no preceding vehicle exists immediately in front of the electric vehicle, instruct the electric vehicle to decelerate to a reduced speed limit.

11. The one pedal driving system of claim 1, wherein the one pedal driving zone includes a signalized intersection.

12. The one pedal driving system of claim 11, wherein the controller executes instructions to:
    in response to receiving the active zone notification and the pedal notification, monitor one or more vehicle systems to determine the electric vehicle is either preceding straight through the signalized intersection or is about to make a turn;

in response to determining the electric vehicle is about to make a turn, allow the electric vehicle to turn without decelerating the electric vehicle; and in response to determining the electric vehicle is about to proceed straight through the signalized intersection, control a rate of deceleration of the electric vehicle based on a presence of a preceding vehicle being detected immediately in front of the electric vehicle.

13. The one pedal driving system of claim 1, wherein the one pedal driving zone includes an intersection having a stop sign.

14. The one pedal driving system of claim 1, wherein the one pedal driving zone is a section of the roadway where one or more emergency vehicles are responding to an incident.

15. The one pedal driving system of claim 1, wherein the one pedal driving zone includes a graded section of roadway.

16. The one pedal driving system of claim 15, wherein the graded section of roadway is either an uphill grade or a downhill grade.

17. A one pedal driving system for an electric vehicle including one or more electric motors, the one pedal driving system comprising:

a controller in wireless communication with one or more external vehicle networks, wherein the controller executes instructions to:

receive, from the one or more external vehicle networks, an active zone notification that indicates the electric vehicle is traveling into a one pedal driving zone, wherein the one pedal driving zone represents a section of roadway where the electric vehicle decelerates from an initial speed;

receive a pedal notification that a driver foot is removed from an accelerator pedal of the electric vehicle; and in response to receiving the active zone notification and the pedal notification, instruct the electric vehicle to decelerate from the initial speed to a stop by a regenerative braking torque that is created by the one or more electric motors to counteract a forward momentum of the electric vehicle.

18. The one pedal driving system of claim 17, wherein the one pedal driving zone includes one of the following: a signalized intersection, a stop sign, and an emergency vehicle.

19. A one pedal driving system for an electric vehicle including one or more electric motors, the one pedal driving system comprising:

a controller in wireless communication with one or more external vehicle networks, wherein the controller executes instructions to:

receive, from the one or more external vehicle networks, an active zone notification that indicates the electric vehicle is traveling into a one pedal driving zone, wherein the one pedal driving zone represents a section of roadway where the electric vehicle decelerates from an initial speed;

receive a pedal notification that a driver foot is removed from an accelerator pedal of the electric vehicle; and in response to receiving the active zone notification and the pedal notification, instruct the electric vehicle to decelerate from the initial speed to a reduced speed by a regenerative braking torque that is created by the one or more electric motors to counteract a forward momentum of the electric vehicle.

20. The one pedal driving system of claim 17, wherein the one pedal driving zone includes one of the following: a graded section of roadway, an active work zone, and a horizontal curve.

* * * * *